United States Patent [19]

Kirchner et al.

[11] Patent Number: 4,795,098

[45] Date of Patent: Jan. 3, 1989

[54] ELECTROMAGNETICALLY ACTUATABLE VALVE

[75] Inventors: Marcel Kirchner, Stuttgart; Hans Kubach, Korntal-Munchingen; Asta Hascher-Reichl, Stuttgart, all of Fed. Rep. of Germany

[73] Assignee: Robert Bosch GmbH, Stuttgart, Fed. Rep. of Germany

[21] Appl. No.: 74,218

[22] Filed: Jul. 16, 1987

[30] Foreign Application Priority Data

Sep. 4, 1986 [DE] Fed. Rep. of Germany ....... 3630092

[51] Int. Cl.[4] ....................... F02M 51/08; F16K 31/02

[52] U.S. Cl. ................................ 239/585; 251/129.16

[58] Field of Search ....................... 251/129.21, 129.16, 251/129.22; 123/472; 239/585, 533.2

[56] References Cited

U.S. PATENT DOCUMENTS 4,356,980 11/1982 Krauss ................................ 239/585
4,476,423 11/1983 Krauss et al. ....................... 239/585
4,555,060 11/1985 Knapp et al. ....................... 239/585
4,648,559 3/1987 Fuller ................................ 239/585

*Primary Examiner*—Andres Kashnikow
*Assistant Examiner*—Karen B. Merritt
*Attorney, Agent, or Firm*—Edwin E. Greigg

[57] ABSTRACT

An electromagnetically actuatable valve that serves in particular in inject fuel into the intake tube of internal combustion engines operating with fuel injection systems. The fuel injection valve includes a valve housing core with a surrounding magnetic coil and a guide diaphgram secured across the valve housing, the guide diaphragm urges an armature/valve closing element, embodied in one piece in the form of a spherical section, toward a valve seat. The guide diaphragm loosely engages a flat bearing face of the armature, so that the valve closing element can automatically center itself with respect to the valve seat. Upon a reciprocating movement of the armature/valve closing element, the frictional force between the guide diaphragm and the bearing face prevents a radial movement of the armature/valve closing element.

21 Claims, 3 Drawing Sheets

ELECTROMAGNETICALLY ACTUATABLE VALVE

BACKGROUND OF THE INVENTION

The invention is based on an electromagnetically actuatable valve. A valve is already known in which a guide diaphragm engages an armature connected to a valve closing element in such a way that with a central guide opening, the guide diaphragm engages the circumference of the valve closing element and guides it radially, while on the other side the guide diaphragm rests on a guide edge and guides the armature parallel to the core. However, assembling this valve so as to assure adequate good centering of the armature and the valve closing element with respect to the valve seat requires excessive time and hence is not cost-effective.

OBJECT AND SUMMARY OF THE INVENTION

The electromagnetically actuatable valve according to the invention has an advantage over the prior art that the radial guidance of the armature and the valve closing element is effected solely by the forces of friction acting opposite the guide diaphragm, so that self-centering of the valve closing element with respect to the valve seat is possible and is retained when there is a reciprocating movement. As a result, the effort and expense for assembly are reduced substantially. The exact adjustment of the valve closing element with respect to the valve seat assures that when the valve closing element strikes the valve seat, the energy of motion is distributed over the entire circumference of the valve seat, thus minimizing the pressure per unit of surface area thereby reducing wear.

It is particularly advantageous to provide the guide diaphragm with openings in the vicinity of magnet poles that extend inward from the valve housing to beyond the armature.

It is also advantageous to embody the armature and the valve closing element in one piece, with a spherical sealing face oriented toward the valve seat; this results in small masses that have to be moved, and so only a small magnetic coil is needed, and lower driving currents are required.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
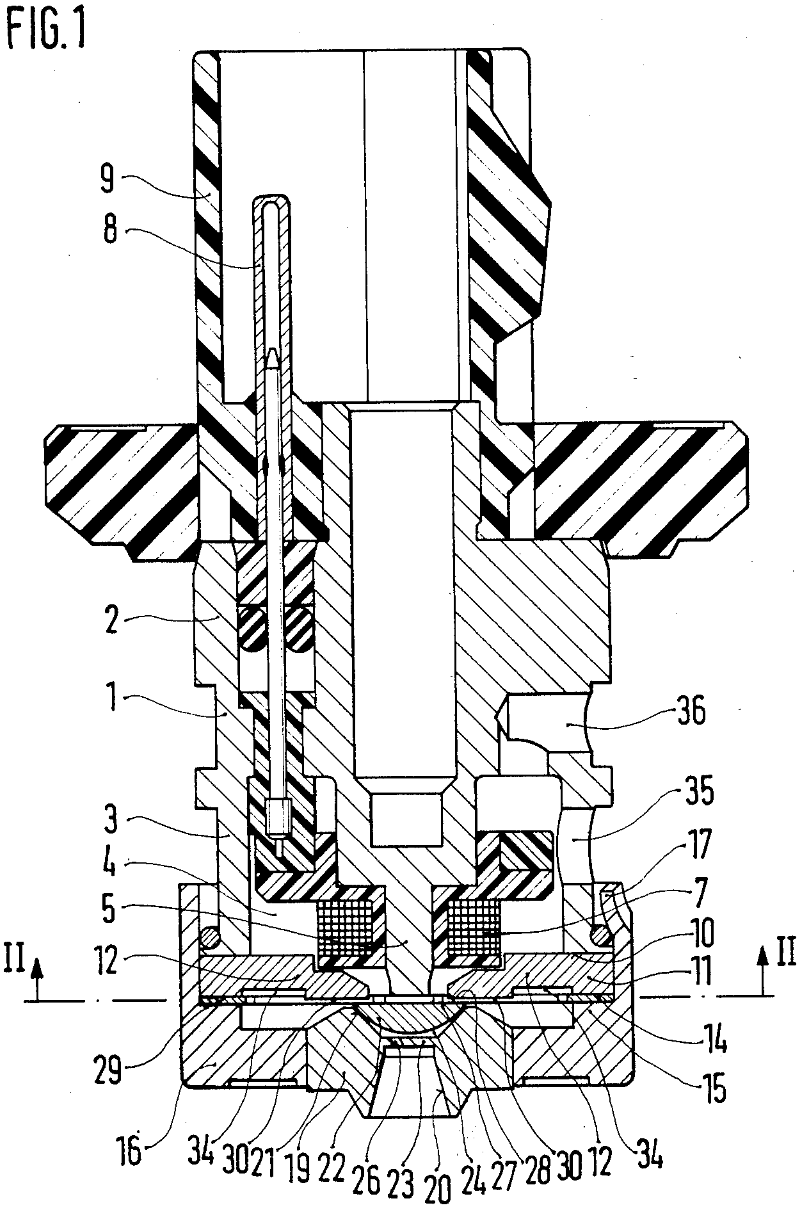
FIG. 1 shows a first exemplary embodiment of a valve according to the invention, in simplified fashion.
Figure 2:
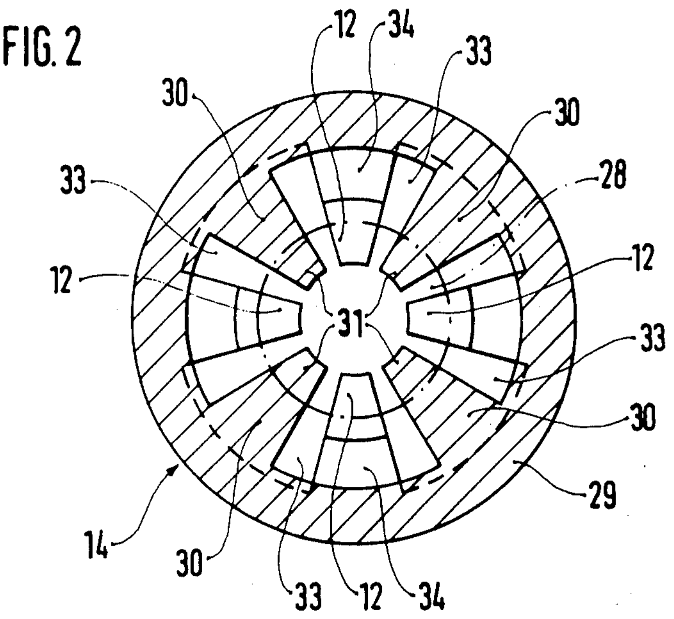
FIG. 2 is a section taken along the line II—II of FIG. 1.

The fuel injection valve shown in FIGS. 1 and 2, for a fuel injection system, serves for instance to inject fuel into the intake tube of mixture-compressing internal combustion engines having externally supplied ignition. A valve housing 1 has an upper portion 2 and a tubular section 3 of the valve housing which surrounds an inner chamber 4. The valve housing 1 is made of soft-magnetic material. Extending into the inner chamber 4 along the axis of the injection valve is a core 5, for instance embodied by being formed as a portion of the valve housing, which is stepped in shape. Mounted on the core 5 is a magnetic coil 7, to which the supply of current is effected via contact prongs 8, which are guided in a sealed manner into the housing and terminate in a plug 9 mounted upon the valve housing 1. Resting on the end face 10 of the valve housing 1 remote from the upper portion 2 is a pole ring 11 of soft-magnetic material, from which magnet poles 12 extend radially inward. A guide diaphragm 14 rests on a surface of the pole ring 11 opposite from the end face 10 and by means of a step 15 of a nozzle holder 16 is held, in place against the pole ring 11. The guide diaphragm and pole ring are held in place with the pole ring against the end face 10 of a valve housing 1, by a flanged rim 17 of a nozzle holder 16.

A nozzle body 19, which has a preparation bore 20 embodied as a blind bore and widening in conical fashion toward the open end, is inserted into the nozzle holder 16. Oriented toward the inner chamber 4, a fixed valve seat 21 is embodied on the nozzle body 19, extending conically or spherically in the axial direction of the valve; cooperating with the valve seat is a movable valve closing element 22. When the valve closing element 22 is resting on the valve seat 21, a collecting chamber 24 is enclosed by the nozzle body 19 between the valve closing element 22 and an intermediate wall 23 that closes off with respect to the preparation bore 20; the collecting chamber 24 is intended to have the smallest possible volume. Leading from the collecting chamber 24, through the intermediate wall 23, is at least one fuel metering bore 26, which extends generally on an incline downwardly with respect to the longitudinal axis of the valve and serves to meter fuel. The fuel metering bores 26 may discharge at a tangent into the preparation bore, or in such a way that the fuel emerges from the fuel metering bore at the intermediate wall 23 initially without touching the axially extending wall of the preparation bore 20 and striking this wall only in the vicinity of the end of the preparation bore 20 remote from the intermediate wall 23, forming a fine fuel film as it emerges from the preparation bore.

The valve closing element is made in one piece of soft-magnetic material and has one segment serving as an armature 27, which is remote from the valve seat 21 and with a bearing face 28 rests loosely, that is, without fastening means, on the guide diaphragm 14. The valve closing element 22 embodied integrally with the armature 27 is advantageously embodied as a spherical section, the spherical surface cooperates with the valve seat 21 and the flat bearing face 28 of which is loosely engaged by the guide diaphragm 14 and urges the valve closing element toward the valve seat 21. As shown more clearly in FIG. 2, spring tongues 30, which protrude axially partway beyond the armature 27 are supported on the bearing face 28 and protrude toward the center from an outer fastening ring 29 of the guide diaphragm 14. The fastening ring is fastened between the step 15 of the nozzle holder 16 and the pole ring 11. The bearing face 28 of the valve is represented in FIG.

2 by dot-dash lines. The free ends 31 of the spring tongues 30 rests on the bearing face 28 of the armature 27 and terminate before the center point of the guide diphragm 14. In the exemplary embodiment shown in FIG. 2, the guide diaphragm 14 has four spring tongues 30, for example, between which openings 33 are provided, in the vicinity of the magnet poles 12, which in the present case four are shown, and the magnet poles extend in star-like fashion toward the longitudinal axis of the valve. The star-like magnet poles 12 minimize the stray magnetic flux and maximize the hydraulic damping when the closing element 22 strikes the valve seat. The magnet poles 12 extend toward the longitudinal axis of the valve partly covering the armature 27 and terminate in a radial spaced relationship with the core 5, and includes an end portion not covering the armature 27, formed by a recess 34 which is oriented toward the guide diaphragm 14.

A fuel supply bore 35 is embodied in the wall of the tubular section 3, by way of which bore the fuel is supplied, in particular at low pressure, from a fuel supply source (not shown) and can reach the inner chamber 4 of the valve housing 1. After flushing the magnetic coil 7, unneeded fuel and any vapor bubbles contained in the fuel flow to a fuel return bore 36 in the valve housing 1, which bore also communicates with the inner chamber 4, and from there flows back to the fuel supply source via a return line. The fuel pressure and the spring tongues 30 hold the armature 27 and valve closing element 22 in the closing position on the valve seat 21, on which the valve closing element 22 can center itself in a self-adjusting manner, because of the absence of a rigid connection with the spring tongues 30. If the magnetic coil is now excited, then because of the electromagnetic field produced, the armature 27 is drawn axially toward the magnet poles 12, counter to the force of the spring tongues 30, and comes to rest with the flat bearing face 28 on the magnet poles 12 which extend between the spring tongues. During this opening movement, because of the frictional force between the spring tongues 30 and the bearing face 28 of the armature and the magnetic attraction of the magnet poles, the armature 27 maintains its radial position, and because of this frictional force the valve is held in this radial position even after de-excitation of the magnetic coil 7 during the closing movement of the valve closing element 22, so that the valve closing element 22 meets the valve seat 21 centrally and is properly seated. The contacting portions of the bearing face 28 of the armature 27 and of the magnet poles 12, as well as the valve seat 21, may be provided with wear resistant surfaces, for instance by nitriding or by being coated with some harder material.

Figure 3:
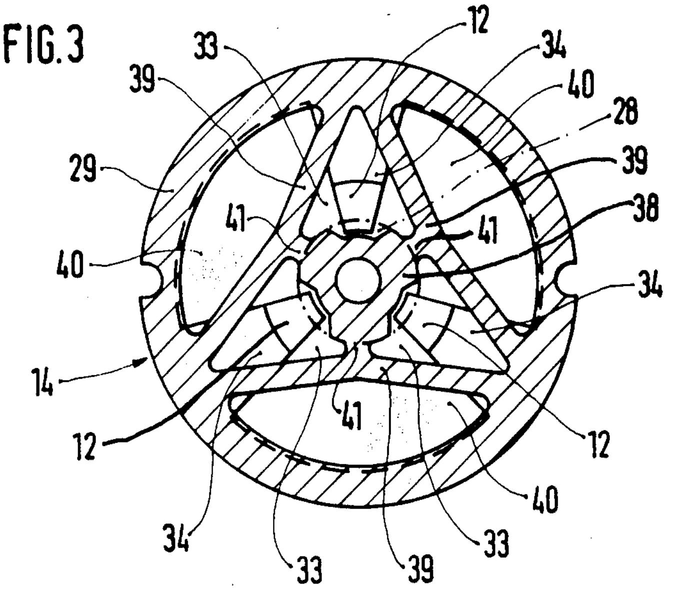
FIG. 3 shows a second exemplary embodiment of a valve according to the invention in a cross section taken in the vicinity of the guide diaphragm.

The second exemplary embodiment shown in FIG. 3 is shown in a cross section taken through the valve approximately at the level of the line II—II in FIG. 1, with three magnet poles 12; elements that are the same as and have the same function as those of FIGS. 1 and 2 are identified by the same reference numerals. The guide diaphragm 14 in the exemplary embodiment of FIG. 3 has a central bearing region 38, which extends over part of the bearing face 28 of the armature 27 and together with resilient ribs 39 defines the openings 33 in the vicinity of which the magnet poles 12 extend, which protrude partway beyond the bearing face 28 of the armature 27. The three ribs 39 defining the openings 33 extend approximately in the form of an equilateral triangle with respect to one another, inside the fastening ring 29, and between themselves and the fastening ring 29 they define recesses 40. Connecting ribs 41 from the bearing region 38 to each rib 39 are kept narrow, to assure easy flexing, so that during reciprocation, the bearing region 38 remains largely flat. As in the exemplary embodiment of FIGS. 1 and 2, the valve closing element in the exemplary embodiment of FIG. 3 is adjusted automatically in the valve seat, and upon a reciprocating movement the radial location is maintained, because of the frictional forces between the bearing region 38 of the guide diaphragm 14 and the bearing face 28 of the armature 27.

Figure 4:
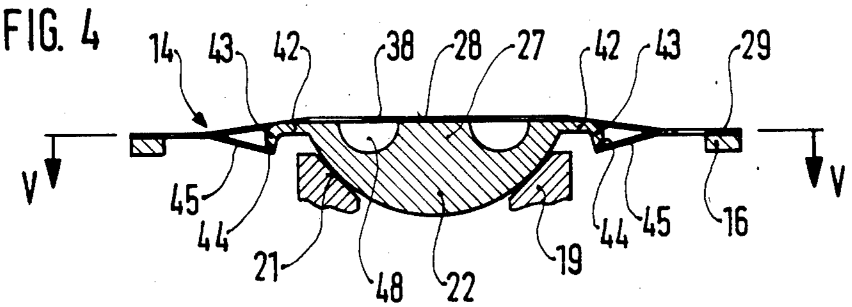
FIG. 4 shows a third exemplary embodiment of a valve according to the invention in a fragmentary longitudinal section.
Figure 5:
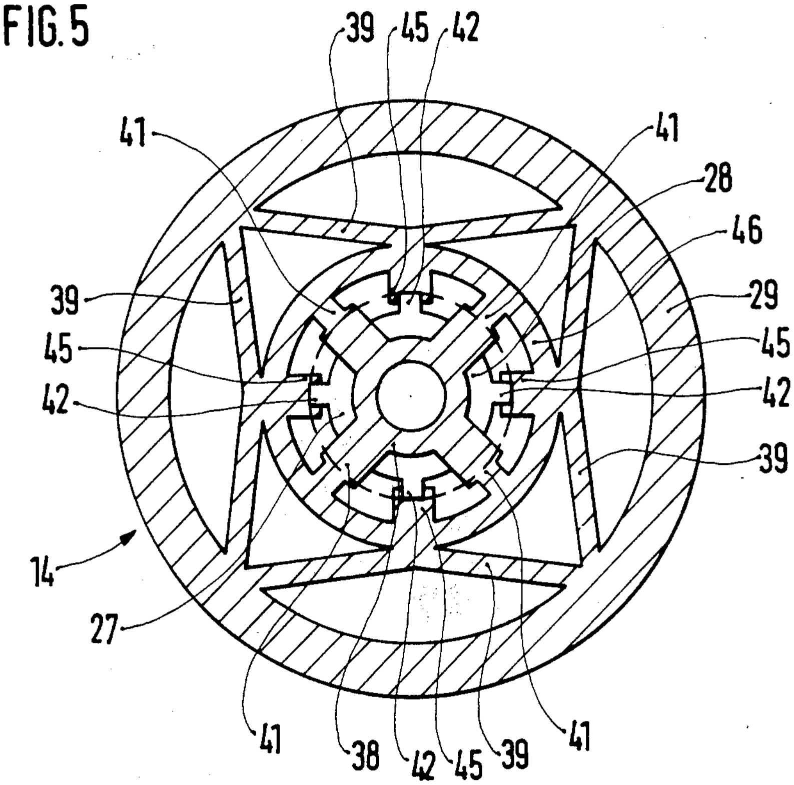
FIG. 5 is a section taken along the line V—V of FIG. 4.

In the third exemplary embodiment according to FIGS. 4 and 5, elements that are the same and function the same as those of the other embodiments described above are again identified by the same reference numerals. The armature 27 here has a collar 42, which may be circular as shown by dashed lines in FIG. 5 and is oriented toward the guide diaphragm 14 and protrudes beyond the spherical-segment-like armature 27 or beyond the valve closing element 22 in the plane of the bearing face 28 and beyond which in turn the bearing region 38 of the guide diaphragm 14 protrudes partway; the collar 42 has a rim 43 extending in an axial direction of the valve and the opposite face 44 of the rim, remote from the bearing face, is engaged by the free ends of retaining tongues 45, which are secured on the other end on a middle ring 46 of the guide diaphragm 14. From the bearing region 38 of the guide diaphragm 14, the connecting ribs 41 likewise lead to the middle ring 46, the other side of which is engaged by the ribs 39 in their middle region. In the exemplary embodiment shown in FIGS. 4 and 5, four ribs 39, forming a square, are provided. The collar 42 need not necessarily be a circular ring, as shown in dashed lines in FIG. 5; instead, as shown in FIG. 5, individual collar sections with a finite width corresponding to the collar sections shown at 42 in FIG. 5 can be provided. In FIG. 5, four collar sections 42 are shown, and a certain axial retaining force of the armature 27 on the guide diaphragm 14 is exerted via these four collar sections 42 and the retaining tongues 45. This retaining force, however, does allow the valve closing element to adjust automatically at the valve seat 21, as also described above for the other exemplary embodiments. Recesses 48 in the armature 27 or in the valve closing element 22 enable a reduction of the mass and hence a reduction in the magnetic force required.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable fuel injection valve for fuel injection systems of internal combustion engines, comprising a valve housing, a core of ferromagnetic material, a magnetic coil mounted on said core, a valve seat, a valve closing element 22, an armature firmly secured to said valve closing element and having a flat bearing face, said valve closing element cooperating with said fixed valve seat, a guide diaphragm that urges said valve closing element toward said valve seat, said guide diaphragm having an outer circumferential facial surface by which said guide diaphragm is secured in place within said housing, said guide diaphragm extends in a plane between said core and said armature (22, 27) and has a central portion that rests loosely, without any fastening means, on said flat bearing face (28) of said armature (22, 27) and said valve closing element is guided relative to said valve seat by a frictional contact between said central portion of said guide diaphragm and said flat bearing face of said armature.

2. A valve as defined by claim 1, in which said guide diaphragm (14) is provided with openings (33) within which magnetic poles extend.

3. A valve as defined by claim 1, in which said armature (27) and said valve closing element (22) are embodied in one piece, with said valve closing element having a spherical sealing face oriented toward said valve seat (21).

4. A valve as defined by claim 2 in which said armature (27) and said valve closing element (22) are embodied in one piece, with said valve closing element having a spherical sealing face oriented toward said valve seat (21).

5. A valve as defined by claim 3, in which said armature (27) and valve closing element (22) are embodied as a spherical section.

6. A valve as defined by claim 4, in which said armature (27) and valve closing element (22) are embodied as a spherical section.

7. A valve as defined by claim 2 in which said guide diaphragm (14) is provided with spring tongues (30) having free ends extending inward between said magnet poles (12), said free ends (31) of the spring tongues engaging said flat bearing face of said armature (27).

8. A valve as defined by claim 3 in which said guide diaphragm (14) is provided with spring tongues (30) having free ends extending inward between said magnet poles (12), said free ends (31) of the spring tongues engaging said flat bearing face of said armature (27).

9. A valve as defined by claim 4, in which said guide diaphragm (14) is provided with spring tongues (30) having free ends extending inward between said magnet poles (12), said free ends (31) of the spring tongues engaging said flat bearing face of said armature (27).

10. A valve as defined by claim 5, in which said guide diaphragm (14) is provided with spring tongues (30) having free ends extending inward between said magnet poles (12), said free ends (31) of the spring tongues engaging said flat bearing face of said armature (27).

11. A valve as defined by claim 6, in which said guide diaphragm (14) is provided with spring tongues (30) having free ends extending inward between said magnet poles (12), said free ends (31) of the spring tongues engaging said flat bearing face of said armature (27).

12. A valve as defined by claim 2, in which said guide diaphragm (14) has a central bearing region (38) which rests on said flat bearing face of said armature (27) and has resilient ribs (39) secured to said circumference, from which said bearing region (38) is suspended.

13. A valve as defined by claim 3, in which said guide diaphragm (14) has a central bearing region (38) which rests on said flat bearing face of said armature (27) and has resilient ribs (39) secured to said circumference, from which said bearing region (38) is suspended.

14. A valve as defined by claim 4, in which said guide diaphragm (14) has a central bearing region (38) which rests on said flat bearing face of said armature (27) and has resilient ribs (39) secured to said circumference, from which said bearing region (38) is suspended.

15. A valve as defined by claim 5, in which said guide diaphragm (14) has a central bearing region (38) which rests on said flat bearing face of said armature (27) and has resilient ribs (39) secured to said circumference, from which said bearing region (38) is suspended.

16. A valve as defined by claim 7, in which said guide diaphragm (14) has a central bearing region (38) which rests on said flat bearing face of said armature (27) and has resilient ribs (39) secured to said circumference, from which said bearing region (38) is suspended.

17. A valve as defined by claim 12, in which said armature (27) includes a collar (42), which is oriented radially toward said core (5), said collar including an upper bearing face (28) which rests on said central bearing region (38) of said guide diaphragm (14), said collar including an axially extending rim having a lower face which is oriented axially, said diaphragm including axially oriented retaining tongues (45) which hold said collar against said central bearing region (38) of said diaphragm.

18. A valve as defined by claim 12, in which said armature (27) and valve closing element (22) are embodied as a spherical section.

19. A valve as defined by claim 13, in which said armature (27) and valve closing element (22) are embodied as a spherical section.

20. A valve as defined by claim 16, in which said armature (27) and valve closing element (22) are embodied as a spherical section.

21. A valve as set forth in claim 1, in which said flat bearing face is on a central portion of said armature along the axis of said valve seat.

* * * * *